United States Patent [19]

Henriksson

[11] Patent Number: 5,607,114
[45] Date of Patent: Mar. 4, 1997

[54] LINE SPOOL ASSEMBLY CONSISTING OF TWO SLEEVE MEMBERS AND INTENDED FOR AN OPEN-FACE FISHING REEL

[75] Inventor: Bengt-Åke Henriksson, Svängsta, Sweden

[73] Assignee: ABU AB, Svängsta, Sweden

[21] Appl. No.: 508,078

[22] Filed: Jul. 27, 1995

[51] Int. Cl.⁶ .................................................. A01K 89/02
[52] U.S. Cl. ........................................... 242/244; 242/318
[58] Field of Search ..................................... 242/244, 246, 242/322, 318

[56] References Cited

U.S. PATENT DOCUMENTS

| | | | |
|---|---|---|---|
| 2,988,298 | 6/1961 | Purnell | 242/244 |
| 3,198,456 | 8/1965 | Wood | 242/244 X |
| 3,565,362 | 2/1971 | Lilland et al. | 242/355 |
| 3,682,411 | 8/1972 | Dumbauld | 242/318 X |
| 4,549,702 | 10/1985 | Councilman | 242/246 |
| 4,951,897 | 8/1990 | Takeuchi | 242/246 |
| 5,197,690 | 5/1993 | Hlava | 242/244 |

Primary Examiner—Daniel P. Stodola
Assistant Examiner—Emmanuel M. Marcelo
Attorney, Agent, or Firm—Browdy and Neimark

[57] ABSTRACT

A line spool assembly to be mounted on a spindle in an open-face fishing reel of the fixed-spool type has a hollow shaft non-rotatably mountable on the spindle, and a line spool rotatably mounted on the shaft. The line spool has an inner sleeve member rotatably mounted on the shaft, and an outer sleeve member for receiving a fishing line wound thereon, the outer sleeve member being non-rotatably mounted on the inner sleeve member and, by a releasable locking element, axially fixed thereto. A line spool drag acting between the shaft and the inner sleeve member for braking the rotation thereof around the shaft. The outer sleeve member is, when the locking element is released, axially removable from the inner sleeve member so as to be separated from the rest of the line spool assembly.

2 Claims, 2 Drawing Sheets

5,607,114

LINE SPOOL ASSEMBLY CONSISTING OF TWO SLEEVE MEMBERS AND INTENDED FOR AN OPEN-FACE FISHING REEL

BACKGROUND OF THE INVENTION

The present invention relates to a line spool assembly for mounting on a spindle in an open-face fishing reel of the fixed-spool type.

A line spool assembly of this type is known from, for instance, U.S. Pat. No. 5,007,602. This prior-art assembly comprises a line spool which has a central portion on which a line is wound, and two radially projecting end flanges which are located on both sides of the central portion.

The line spool is rotatably mounted on a hollow shaft which is non-rotatably connected to a spindle in an open-face fishing reel of the fixed-spool type. The hollow shaft is passed over the spindle and retained thereon by resilient means provided on the front end portion of the spindle. A push button in the form of a sleeve is axially displaceable on the front end of the spindle. When the shaft and the line spool mounted thereon should be removed from the spindle, the push button is pressed inwards a distance on the spindle so as to release the resilient means from the shaft such that the shaft can be drawn off the spindle.

A line spool drag for adjustable braking of the rotation of the line spool around the shaft has a first drag washer, which is non-rotatably connected to the line spool and engages the rear side of its rear end flange, a second drag washer, which is non-rotatably connected to the shaft and engages a rear stop lug thereon, and a friction washer, which is provided between the drag washers in frictional engagement therewith. An adjusting knob for adjusting the braking effect of the line spool drag is screwed on the front end of the shaft. The force by which the washers of the line spool drag are pressed against each other determines the braking effect exerted on the line spool during its rotation around the shaft. This force is set by rotation of the adjusting knob, which when rotating in a direction corresponding to an increasing braking effect presses the line spool backwards on the shaft and, thus, increases the compression force exerted on the washers.

In its front portion, the line spool has a central recess which accommodates a click mechanism, which produces a click sound when the adjusting knob is rotated. A ball bearing for rotatable mounting of the line spool on the shaft is also arranged in this recess. A buzz mechanism is arranged behind the rear end flange of the line spool to produce a buzz sound when the line spool rotates around the shaft.

When the line spool mounted on the spindle of the fishing reel is to be replaced by a new line spool for e.g. fishing with a line, which has a different thickness than the line wound on the first-mentioned line spool, or, for instance, for replacing the first-mentioned line spool with a line spool, whose central portion has a different depth or whose end flanges are designed in a different manner, the push button is pressed as described above, whereupon the assembly consisting of the line spool and the shaft is removed from the spindle. Also the mechanisms included in this assembly are removed, i.e. the brake-mechanism (line spool drag), the click mechanism and the buzz mechanism, which implies that also the new line spool must constitute part of an assembly, in which, in addition to a shaft, such mechanisms are also included. This means that the replacement assemblies are fairly complicated and, thus, expensive.

SUMMARY OF THE INVENTION

The object of the present invention therefore is to provide a line spool assembly, which is so designed that it enables an exchange of the actual line spool with the fishing line wound thereon, without necessitating replacement of the line spool drag and any other mechanisms, such as click mechanism and buzz mechanism.

According to the present invention, this object is achieved by means of a line spool assembly for mounting on a spindle in an open-face fishing reel of the fixed-spool type, comprising a hollow shaft non-rotatably mountable on said spindle;

a line spool rotatably mounted on said shaft; and a line spool drag for adjustable braking of the rotation of said line spool around said shaft;

said line spool having an inner sleeve member rotatably mounted on said shaft, and an outer sleeve member for receiving a fishing line wound thereon, said outer sleeve member being non-rotatably mounted on said inner sleeve member and, by means of a releasable locking element, axially fixed thereto;

said line spool drag acting between said shaft and said inner sleeve member for braking the rotation thereof around said shaft; and said outer sleeve member, when said locking element is released, being axially removable from said inner sleeve member so as to be separated from the rest of said line spool assembly.

BRIEF DESCRIPTION OF THE DRAWINGS

The invention will now be described in more detail with reference to the accompanying drawings in which.

DESCRIPTION OF THE PREFERRED EMBODIMENT

Figure 2:
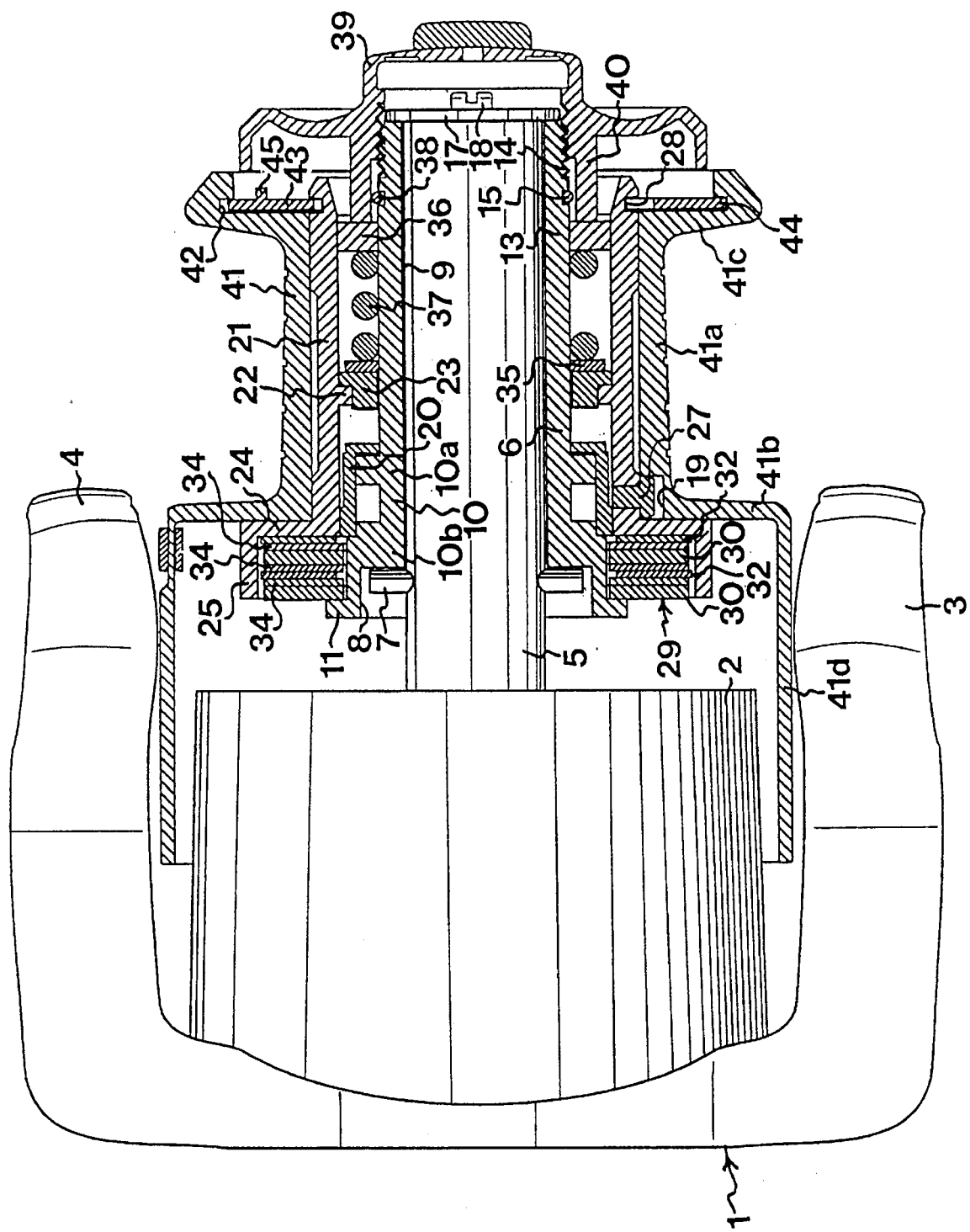
FIG. 2 is an axial longitudinal section of the line spool assembly in FIG. 1, the line spool assembly being shown mounted on a spindle in a schematically and only partly illustrated fishing reel of the fixed-spool type.

The fishing reel shown schematically and only partly in FIG. 2 is an open-face fishing reel of the fixed-spool type and has a rotor 1 with a cylinder part 2 and two diametrically opposed arms 3 and 4 which are integrated with the cylinder part 2 and extend axially forwards at a radial distance therefrom. The arms 3 and 4 constitute attachments for a pivotable bail (not shown). An axially oscillatable spindle 5 extends through the rotor 1 and projects forwardly therefrom. The fishing reel of the fixed-spool type is, apart from the line spool assembly according to the present invention, of prior-art type (see e.g. U.S. Pat. No. 4,927,094) and is therefore not described in more detail here.

It should be noted that "forwards", "backwards", "front" and "rear" in this specification and in the accompanying claims are used with reference to the position of the fishing reel when, mounted on a fishing rod, used by an angler. The direction forwards thus is in the direction to the right in FIG. 2.

Figure 1:
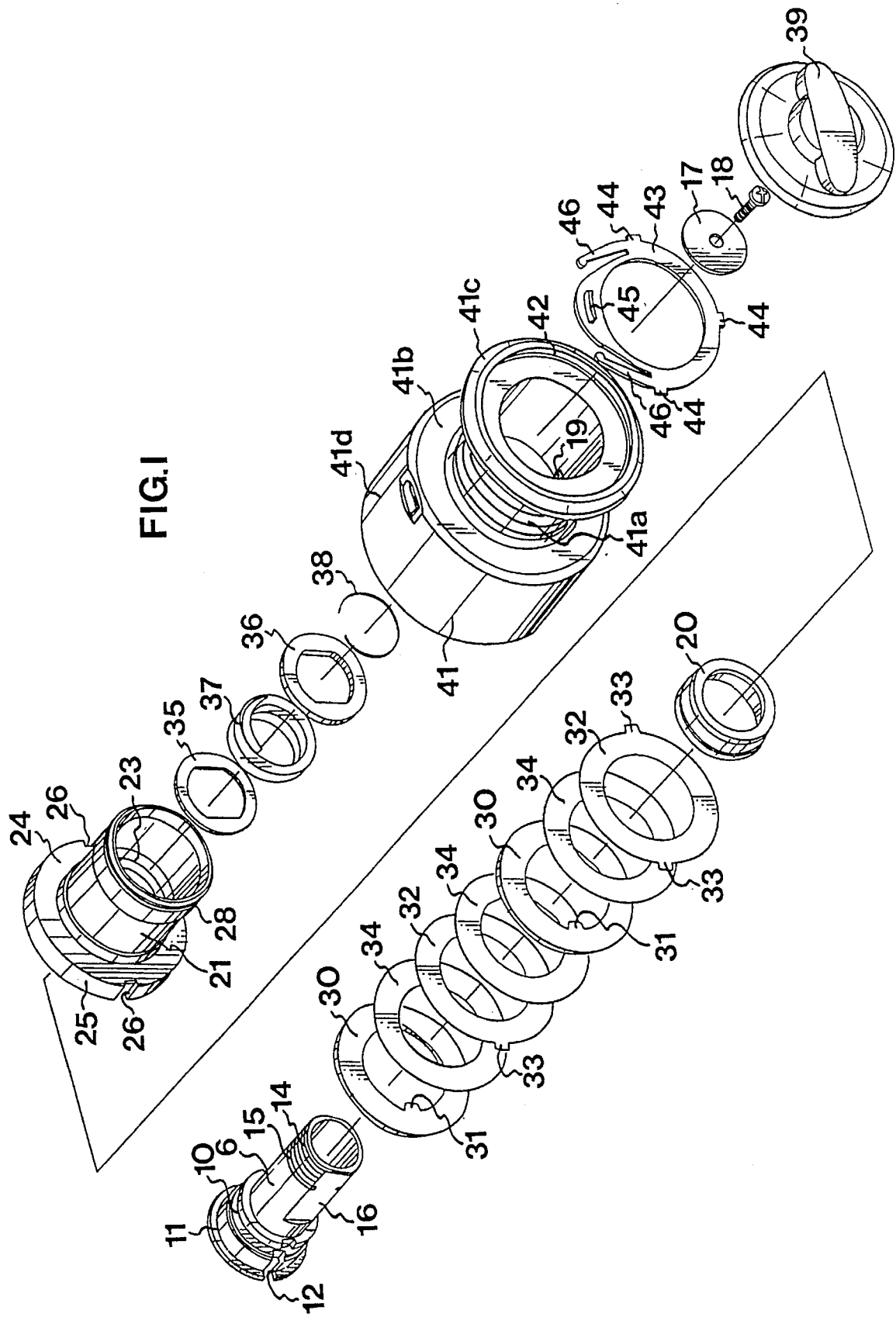
FIG. 1 is an exploded view illustrating a line spool assembly according to the present invention.

The line spool assembly shown in the drawings has a hollow shaft 6 which is non-rotatably connected to the spindle 5 by means of a diametrically projecting pin 7 provided on the spindle and engaging in a mating recess 8 in the rear end surface of the shaft 6. The hollow shaft 6 has a through bore 9, the diameter of which is equal to the diameter of the spindle 5. The shaft 6 has a rear portion 10, whose outer diameter is greater than that of the rest of the shaft. This rear portion 10 consists of a circumferential front shoulder 10a and a circumferential rear shoulder 10b which has a greater diameter than the front shoulder. The rear shoulder 10b has a circumferential, radially projecting rear end flange 11. Two diametrically opposed, axially directed slits 12 (of which only one is to be seen in FIG. 1) extend along the rear shoulder 10b and through the end flange 11 thereof. The shaft 6 has a front portion 13 which has an external thread 14 at its front end and an external circumferential groove 15 just behind this thread. Two planar surfaces 16 (of which only one is to be seen in FIG. 1 are formed diametrically trically opposite each other in the front portion 13 of the shaft 6, thereby forming a flat. The shaft 6 is axially fixed to the spindle by means of an attachment washer 17, which engages the front end surfaces of the spindle 5 and the shaft 6 and is attached by means of a screw 18, which is axially screwed in the spindle 5.

A rear bearing sleeve 20 is arranged on the front shoulder 10a of the rear shaft portion 10 and is held non-rotatable thereon with press fit.

An inner sleeve member 21, which in its central portion has a circumferential, internal lug 22 and accommodates a front bearing sleeve 23, which with press fit is pressed into the inner sleeve member 21 into engagement with the lug 22, is rotatably mounted on the shaft 6 by means of the bearing sleeves 20 and 23. The inner sleeve member 21 has, in its rear portion, a circumferential, radially projecting flange 24 and, projecting backwards a short distance therefrom, a cylindrical portion 25. The cylindrical portion 25 has two diametrically opposed slits 26 extending axially into the cylindrical portion 25 from the rear edge thereof. The inner sleeve member 21 has, immediately in front of the flange 24, a radially projecting pin 27 and has, in its front portion, an external circumferential groove 28.

A line spool drag 29 comprises two drag washers 30, which have two diametrically opposed, radially inwardly directed projections 31 and are non-rotatably connected to the shaft 6 by these projections 31 engaging in the slits 12 in the rear portion 10 of the shaft, two drag washers 32 which have two diametrically opposed, radially outwardly directed projections 33 and are non-rotatably connected to the inner sleeve member 21 by these projections 33 engaging in the slits 26 in the cylindrical portion 25, and three friction washers 34. The line spool drag 29 is composed of two groups of washers, each group comprising a drag washer 30 non-rotatably connected to the shaft 6, a drag washer 32 non-rotatably connected to the inner sleeve member 21, and an intermediate friction washer 34, as well as of a friction washer 34 arranged between the two groups. The line spool drag 29 is provided between the rear end flange 11 of the shaft 6 and the flange 24 of the inner sleeve member 21, thereby producing an adjustable braking effect between the shaft 6 and the inner sleeve member 21, the adjustability being described in more detail below.

A rear and a front supporting ring 35 and 36, whose central hole has a shape corresponding to the cross-sectional shape of the shaft 6 in the front portion 13 thereof formed with the planar surfaces 16 (the flat), are non-rotatably mounted on the shaft 6 in said portion. The rear supporting ring 35 engages with the front side of the front bearing sleeve 23. A compression spring 37 is provided on the shaft 6 between the two supporting rings 35 and 36. A snap ring 38 is arranged in the circumferential groove 15 of the shaft 6 for preventing the front supporting ring 36 and thus the compression spring 37 and the rear supporting ring 35 and thus also the front bearing sleeve 23 and the inner sleeve member 21 from being drawn off the shaft 6.

A buzz mechanism (not shown), which has axially projecting resilient tongues, can be provided between the two bearing sleeves 20 and 23, the resilient tongues engaging with front teeth (not shown) on the rear bearing sleeve 20 and rear teeth (not shown) on the front bearing sleeve 23 for producing a buzz sound when the inner sleeve member 21 is rotated around the shaft 6.

An adjusting knob 39 with an internally threaded sleeve portion 40 is screwed on the thread 14 of the shaft 6. The rear end of the knob 39, i.e. the free end of the sleeve portion 40, engages the front supporting ring 36. When the knob 39 is screwed further inwards, it presses the front supporting ring 36 backwards in order to press, via the compression spring 37, the rear supporting ring 35 and the front bearing sleeve 23, the inner sleeve member 21 backwards more forcefully. As a result, the washers 30, 32 and 34 of the line spool drag 29 are pressed together more firmly between the rear end flange 11 of the shaft 6 and the flange 24 of the inner sleeve member 21, such that the braking effect of the line spool drag 29 increases. Correspondingly, the braking effect of the line spool drag 29 decreases, when the knob 39 is screwed in the opposite direction, i.e. is moved to the right in FIG. 2.

A click mechanism (not shown), which has rearwardly projecting resilient tongues, can be non-rotatably mounted inside the adjusting knob 39, the resilient tongues engaging with teeth (not shown) formed on the front side of the attachment washer 17 so as to produce a click sound when the adjusting knob 39 and the click mechanism non-rotatably mounted therein are rotated.

An outer sleeve member 41, which has a central portion 41a, on which a line (not shown) is to be wound, two radially projecting end flanges 41b, 41c positioned on both sides of the central portion 41a, and a backwardly directed, cylindrical portion 41d reinforcing the rear end flange 41b, is passed over the inner sleeve member 21. The outer sleeve member 41 is non-rotatable relative to the inner sleeve member 21 by the projecting pin 27 thereof engaging in a corresponding recess 19 inside the outer sleeve member 41, when the rear end flange 41b thereof engages the flange 24 of the inner sleeve member 21. In this position, the cylindrical portion 41d of the outer sleeve member 41 extends backwards a distance over the cylinder part 2 of the rotor 1.

The front end flange 41c of the outer sleeve member 41 has an internal circumferential groove 42. A releasable locking element 43 in the form of a spring element engages both in this circumferential groove 42 and in the circumferential groove 28 in the front portion of the inner sleeve member 21. The locking element 43, which thus holds the outer sleeve member 41 axially fixed to the inner sleeve member 21, is resiliently releasable from the circumferential groove 28 of the inner sleeve member 21 in order to permit release of the outer sleeve member 41 from the inner sleeve member 21. The locking element 43 consists of a ring, whose inner diameter is slightly greater than the outer diameter of the inner sleeve member 21 in the front portion. The ring has three radially outwardly directed projections 44, which in the position shown in the drawings project laterally and downwards, a forwardly projecting upper gripper lug 45, and two resilient arms 46 projecting substantially tangentially upwards. The projections 44 and the resilient arms 46 engage in the circumferential groove 42 of the outer sleeve member 41, the locking element 43 being pressed down by the resilient arms 46, such that its upper portion engages in the circumferential groove 28 of the inner sleeve member 21. When the locking element 43 is to be released, the lug 45 is pressed upwards, whereby the locking element is raised, against the spring action of the arms 46, out of its engagement with the circumferential groove 28 of the inner sleeve member 21, such that the outer sleeve member 41 can be drawn off the inner one.

When one wants to fish with a line spool, whose central portion has a different depth or whose end flanges are designed in a different manner, or if one wants to easily replace the fishing line by a new fishing line with a different thickness, the adjusting knob 39 is screwed off from the shaft 6, whereupon the locking element 43 is released from he circumferential groove 28 of the inner sleeve member 21. The outer sleeve member 41 is then drawn off the inner sleeve member 21 and replaced by a new outer sleeve member, which has the desired shape and carries a line with the desired thickness. When the new outer sleeve member reaches the position shown in FIG. 2, its locking element snaps into the circumferential groove 28 of the inner sleeve 21. After that, the adjusting knob 39 is screwed on again.

What I claim and desire to secure by Letters Patent is:

1. A line spool assembly for mounting on a spindle in an open-face fishing reel of the fixed-spool type, comprising:

a hollow shaft adapted to be mounted non-rotatably on said spindle;

a line spool rotatably mounted on said shaft; and a line spool drag for adjustable braking of the rotation of said line spool around said shaft;

a releasable locking element;

said line spool having an inner sleeve member rotatably mounted on said shaft, and an outer sleeve member for receiving a fishing line wound thereon, said outer sleeve member being non-rotatably mounted on said inner sleeve member and, by means of said releasable locking element, axially fixed thereto;

said line spool drag acting between said shaft and said inner sleeve member for braking the rotation thereof around said shaft; and said outer sleeve member, when said locking element is released, being axially removable from said inner sleeve member so as to be separated from the rest of said line spool assembly; wherein said shaft has a radially projecting first rear flange, said inner sleeve member has a radially projecting second rear flange positioned in front of the first rear flange of said shaft, and said line spool drag has at least two drag washers provided between said first rear flange and said second rear flange, one of said drag washers being non-rotatably connected to said shaft and the other being non-rotatably connected to said inner sleeve member, said drag washers being in rotation-impeding frictional engagement with each other.

2. Line spool assembly as claimed in claim 1, wherein said shaft is threaded in its front portion, and an adjusting knob for adjustment of a braking effect of said line spool drag is screwed on said portion, said knob being adapted, when screwed further on said shaft, to press said inner sleeve member backwards, thereby increasing the braking effect of said line spool drag.

* * * * *